United States Patent
Convertino et al.

(10) Patent No.: US 8,656,286 B2
(45) Date of Patent: Feb. 18, 2014

(54) SYSTEM AND METHOD FOR PROVIDING MIXED-INITIATIVE CURATION OF INFORMATION WITHIN A SHARED REPOSITORY

(75) Inventors: Gregorio Convertino, Palo Alto, CA (US); Ed H. Chi, Palo Alto, CA (US); Nicholas Chi-Yuen Kong, Berkeley, CA (US); Benjamin Vincent Hanrahan, Blue Ridge, VA (US); Guillaume Bouchard, Saint-Martin-le-Vinoux (FR); Cedric Philippe C. J. G. Archambeau, Grenoble (FR)

(73) Assignees: Palo Alto Research Center Incorporated, Palo Alto, CA (US); Xerox Corporation, Norwalk, CT (US)

( * ) Notice: Subject to any disclaimer, the term of this patent is extended or adjusted under 35 U.S.C. 154(b) by 268 days.

(21) Appl. No.: 12/940,962

(22) Filed: Nov. 5, 2010

(65) Prior Publication Data

US 2012/0117484 A1 May 10, 2012

(51) Int. Cl.
*G06F 3/00* (2006.01)

(52) U.S. Cl.
USPC .......................................................... 715/744

(58) Field of Classification Search
None
See application file for complete search history.

(56) References Cited

U.S. PATENT DOCUMENTS

| | | | |
|---|---|---|---|
| 2006/0004703 A1 | 1/2006 | Spivack et al. | |
| 2008/0010341 A1* | 1/2008 | Curtis et al. | 709/204 |
| 2009/0234814 A1* | 9/2009 | Boerries et al. | 707/3 |
| 2011/0213655 A1* | 9/2011 | Henkin et al. | 705/14.49 |

OTHER PUBLICATIONS

Tim O'Reilly, "What is Web 2.0: Design Patterns and Business Models for the Next Generation of Software," Communications and Strategies, Iss. 65, pp. 17-37 (Quarter 1, 2007).
Palen et al., "Discretionary Adoption of Group Support Software: Lessons from Calendar Applications," Implementing Collaboration Technologies in Industry: Case Examples and Lessons Learned, pp. 159-179, Springer-Verlag London, UK (2003).
Pirolli et al., "The Sensemaking Process and Leverage Points for Analyst Technology as Identified Through Cognitive Task Analysis," Proceedings of the 2005 International Conference on Intelligence Analysis, 2-4 (May 2005).
Preece et al., "The Reader-to-Leader Framework: Motivating Technology Mediated Social Participation," AIS Transactions on Human-Computer Interaction, vol. 1, Iss. 1, pp. 13-32 (Spring 2009).

(Continued)

*Primary Examiner* — William Bashore
*Assistant Examiner* — Hien Duong
(74) *Attorney, Agent, or Firm* — Patrick J. S. Inouye; Krista A. Wittman; Leonid Kisselev

(57) ABSTRACT

A system and method for providing mixed-initiative curation of information within a shared repository is provided. Static content is retrieved from a shared storage associated with a shared information management client. Dynamic content including one or more information items satisfying a similarity threshold with the static content is identified as similar dynamic content. An interactive visualization is generated within the shared information management client from information extracted from the static content and the similar dynamic content. The interactive visualization of the information is linked with the static content and the similar dynamic content. A selection of the information of the similar dynamic content is received from within the visualization. The static content in the shared storage is updated with the similar dynamic content linked with the selected information.

20 Claims, 11 Drawing Sheets

(56) References Cited

OTHER PUBLICATIONS

Robertson et al., "Simple BM25 Extension to Multiple Weighted Fields," Proceedings of the 13th ACM International Conference on Information and Knowledge Management, pp. 42-49 (Nov. 2004).

Rosenblatt, Frank, "The Perceptron: A Probabilistic Model for Information Storage and Organization in the Brain," Psychological Review, vol. 65, No. 6, pp. 386-408 (Nov. 1958).

Sauper et al., "Automatically Generating Wikipedia Articles: A Structure-Aware Approach," Proceedings of the Joint Conference of the 47th Annual Meeting of the ACL and the 4th International Joint Conference on Natural Language Processing of the AFNLP, vol. 1, pp. 208-216 (Aug. 2009).

Stasko et al., "Jigsaw: Supporting Investigative Analysis Through Interactive Visualization," Information Visualization, vol. 7, No. 2, pp. 118-132 (Summer 2008).

Steecher et al., "Salsa: Leveraging Email to Create a Social Network for the Enterprise," Proceedings of the Third International Conference on Weblogs and Social Media, pp. 323-326 (May 2009).

Suh et al., "Lifting the Veil: Improving Accountability and Social Transparency in Wikipedia with WikiDashboard," Proceedings of the 26th Annual SIGCHI Conference on Human Factors in Computing Systems, pp. 1037-1040 (Apr. 2008).

Talbot et al., "EnsembleMatrix: Interactive Visualization to Support Machine Learning with Multiple Classifiers," Proceedings of the 27th International Conference on Human Factors in Computing Systems, pp. 1283-1292 (Apr. 2009).

Whittaker et al., "ContactMap: Organizing Communication in a Social Desktop," ACM Transactions on Computer-Human Interaction, vol. 11, No. 4, pp. 445-471 (Dec. 2004).

Whittaker et al., "The Dynamics of Mass Interaction," Proceedings of the 1998 ACM Conference on Computer Supported Cooperative Work, pp. 257-264 (Nov. 1998).

Whittaker et al., "Email Overload: Exploring Personal Information Management of Email," Proceedings of the ACM CHI Conference on Human Factors in Computing Systems, pp. 276-283 (Apr. 1996).

Steve Whittaker, "Supporting Collaborative Task Management in Email," vol. 20, Iss. 1, pp. 49-88 (Jun. 2005).

Dennis Wilkinson, "Strong Regularities in Online Peer Production," Proceedings of the 9th ACM Conference on Electronic Commerce, pp. 302-309 (Jul. 2008).

Witte et al., "Connecting Wikis and Natural Language Processing Systems," Proceedings of the 2007 International Symposium on Wikis, pp. 165-176 (Oct. 2007).

Jeffrey Heer, http://flare.prefuse.org/, Sep. 2010 (Last Accessed Nov. 4, 2010).

Intraspect: http://tomgruber.org/technology/intraspect.htm, May 27, 2009 (Last Accessed Nov. 4, 2010).

Topika: http://www.almaden.ibm.com/cs/disciplines/user/interns/2010/#topika, (Last Accessed Nov. 4, 2010).

Adamic et al., "Knowledge Sharing and Yahoo Answers: Everyone Knows Something," Proceedings of the 17th International World Wide Web Conference, pp. 665-674 (Apr. 2008).

Adar et al., "Zoetrope: Interacting with the Ephemeral Web," Proceedings of the 21st Annual ACM Symposium on User Interface Software and Technology, pp. 239-248 (Oct. 2008).

Balakrishnan et al., "Fitting an Activity-centric System into an Ecology of Workplace Tools," Proceedings of the 28th International Conference on Human Factors in Computing Systems, pp. 787-790 (Apr. 2010).

Berners-Lee et al., "The Semantic Web," Scientific American, vol. 284, No. 5, pp. 34-43 (May 17, 2001).

Bier et al., "Entity Workspace: An Evidence File that Aids Memory, Inference, and Reading," Proceedings of the IEEE International Conference on Intelligence and Security Informatics, pp. 466-472 (May 2006).

Blei et al., "Latent Dirichlet Allocation," Journal of Machine Learning Research, vol. 3, pp. 993-1022 (Jan. 2003).

Brzozowski et al., "Effects of Feedback and Peer Pressure on Contributions to Enterprise Social Media," Proceedings of the ACM 2009 International Conference on Supporting Group Work, pp. 61-70 (May 2009).

Michel Buffa, "Intranet Wikis," Proceedings of the Intraweb Workshop, Proceedings of the 15th International World Wide Web Conference, ACM Press (May 2006).

Chan et al., "Vispedia: On-demand Data Integration for Interactive Visualization and Exploration," Proceedings of the 35th SIGMOD International Conference on Management of Data, pp. 1139-1142 (Jun. 29 to Jul. 2, 2009).

Convertino et al., "Designing for Learning Communities in a Large Enterprise," ACM CSCW 2010 Workshop on Collective Intelligence in Organizations: Towards a Research Agenda, (Feb. 2010).

Cselle et al., "BuzzTrack: Topic Detection and Tracking in Email," Proceedings of the 2007 International Conference on Intelligent User Interfaces, pp. 190-197 (Jan. 2007).

Cunningham et al., "GATE: A Framework and Graphical Development Environment for Robust NLP Tools and Applications," Proceedings of the 40th Anniversary Meeting of the Association for Computational Linguistics, pp. 168-175 (Jul. 2002).

Dork et al., "VisGets: Coordinated Visualizations for Web-based Information Exploration and Discovery," IEEE Transactions on Visualization and Computer Graphics, vol. 14, No. 6, pp. 1205-1212 (Nov./Dec. 2008).

Ducheneaut et al., "E-mail as Habitat: An Exploration of Embedded Personal Information Management," Interactions, vol. 8, Iss. 5, pp. 30-38 (Sep./Oct. 2001).

Dugan et al., "Lessons Learned from Blog Muse: Audience-Based Inspiration for Bloggers," Proceedings of the 28th International Conference on Human Factors in Computing Systems, pp. 1965-1974 (Apr. 2010).

Efimova et al., "Crossing Boundaries: A Case Study of Employee Blogging," Proceedings of the 40th Hawaii International Conference on System Sciences, IEEE Computer Society, Washington D.C., 86 (Jan. 2007).

Farzan et al., "Mobilizing Lurkers with a Targeted Task," Proceedings of the Fourth International Conference on Weblogs and Social Media, pp. 101-109 (May 2010).

Faulring et al., "Agent-Assisted Task Management that Reduces Email Overload," Proceedings of the 2010 International Conference on Intelligent User Interfaces, pp. 61-70 (Feb. 2010).

Fernandes et al., "An Ontology-Based Approach for Organizing, Sharing, and Querying Knowledge Objects on the Web," Proceedings of the 14th International Workshop on Database and Expert Systems Applications, pp. 604-609 (Sep. 2003).

Findlater et al., "Ephemeral Adaptation: The Use of Gradual Onset to Improve Menu Selection Performance," Proceedings of the 27th International Conference on Human Factors in Computing Systems, pp. 1655-1664 (Apr. 2009).

Golder et al., "Usage Patterns of Collaborative Tagging Systems," Journal of Information Science, vol. 32, Iss. 2, pp. 198-208 (Apr. 2006).

Guo et al., "Compoweb: A Component-Oriented Web Architecture," Proceedings of the 17th International World Wide Web Conference, pp. 545-554 (Apr. 2008).

Happel, Hans-Jörg, "Social Search and Need-Driven Knowledge Sharing in Wikis with Woogle," Proceedings of the 5th International Symposium on Wikis and Open Collaboration, (Oct. 2009).

Hoffart et al., "An Architecture to Support Intelligent User Interfaces for Wikis by means of Natural Language Processing," Proceedings of the 5th International Symposium on Wikis and Open Collaboration, (Oct. 2009).

Hoffmann et al., "Amplifying Community Content Creation with Mixed Initiative Information Extraction," Proceedings of the 27th International Conference on Human Factors in Computing Systems, pp. 1849-1858 (Apr. 2009).

Holtzblatt et al., "Factors Impeding Wiki Use in the Enterprise: A Case Study," Proceedings of the 28th International Conference Extended Abstracts on Human Factors in Computing Systems, pp. 4661-4676 (Apr. 2010).

(56) References Cited

OTHER PUBLICATIONS

Eric Horvitz, "Principles of Mixed-Initiative User Interfaces," Proceedings of the SIGCHI Conference on Human Factors in Computing Systems: the CHI is the Limit, pp. 159-166 (May 1999).

Kittur et al., "Power of the Few Versus Wisdom of the Crowd: Wikipedia and the Rise of the Bourgeoisie," ALT.CHI at CHI 2007 (Apr. 2007).

Kong et al., "VisualWikiCurator: Human and Machine Intelligence for Organizing Wiki Content," Proceedings of the 16th International Conference on Intelligent User Interfaces, pp. 367-370 (Feb. 2011).

Krämer, Jan-Peter, "PIM-Mail: Consolidating Task and Email Management," Proceedings of the 28th International Conference Extended Abstracts on Human Factors in Computing Systems, pp. 4411-4416 (Apr. 2010).

Krieger et al., "Coordinating Tasks on the Commons: Designing for Personal Goals, Expertise and Serendipity," Proceedings of the 27th International Conference on Human Factors in Computing Systems, pp. 1485-1494 (Apr. 2009).

Kriplean et al., "Articulations of Wikiwork: Uncovering Valued Work in Wikipedia Through Barnstars," Proceedings of the 2008 ACM Conference on Computer Supported Cooperative Work, pp. 47-56 (Nov. 2008).

Majchrzak et al., "Corporate Wiki Users: Results of a Survey," Proceedings of the 2006 International Symposium on Wikis, pp. 99-104 (Aug. 2006).

Matt McKeon, "Harnessing the Web Information Ecosystem with Wiki-based Visualization Dashboards," IEEE Transactions on Visualization and Computer Graphics, vol. 15, No. 6, pp. 1081-1088 (Nov./Dec. 2009).

Matthews et al., "Collaboration Personas: A Framework for Understanding & Designing Collaborative Workplace Tools," ACM CSCW 2010 Workshop on Collective Intelligence in Organizations: Towards a Research Agenda (Feb. 2010).

Muller et al., "Information Curators in an Enterprise File-sharing Service," Proceedings of the Eleventh European Conference on Computer-Supported Work, pp. 403-412 (Sep. 2009).

Nakanishi et al., "SAVVY Wiki: A Context-Oriented Collaborative Knowledge Management System," Proceedings of the 5th International Symposium on Wikis and Open Collaboration, (Oct. 2009).

Nardi et al., "Collaborative, Programmable Intelligent Agents," Communications of the ACM, vol. 41, No. 3, pp. 96-104 (Mar. 1998).

Nelson et al., "Mail2tag: Efficient Targeting of News in an Organization," ACM CSCW 2010 Workshop on Collective Intelligence in Organizations: Towards a Research Agenda (Feb. 2010).

Apple Data Detector: http://macbiblioblog.blogspot.com/2008/02/apple-data-detectors-are-so-useful.html, Feb. 12, 2008 (Last Accessed Nov. 4, 2010).

\* cited by examiner

SYSTEM AND METHOD FOR PROVIDING MIXED-INITIATIVE CURATION OF INFORMATION WITHIN A SHARED REPOSITORY

FIELD

This application relates in general to collaborative information sharing, and in particular, to a system and method for providing mixed-initiative curation of information within a shared repository.

BACKGROUND

Sharing of information within an organization, such as a corporation, is important to remain competitive in the global economy. The problem of efficient and timely information sharing increases as a corporation grows in size as workers become specialized and geographically separated within an organization. Valuable information can include project updates and deadlines, answers to frequently asked questions, competitive intelligence, and references.

Web-based information repositories and collaborative authoring environments, such as wikis, have been deployed in corporate environments to encourage employees to share knowledge at a centralized location. Wikis allow for developing and organizing valuable knowledge through collaborative authoring tools. Despite their wide deployment, wikis have been slow to be adopted by workers due to high interaction costs in time involved in contributing to, and organizing, wiki content. The low adoption rate prevents wikis from reaching a critical mass needed to become a valuable tool for knowledge sharing.

Conventional wikis often suffer from data sparsity and poor organization due to their static nature and lack of support for organization and maintenance of content. Generally, only one view of the wiki content is available to a user, which is unhelpful as different users may have specific information needs that are not satisfied by the single view offered by the wiki. Additionally, the lack of organizational tools leads to difficulty finding content or even duplication of content within the wiki.

Moreover, a worker typically has to undertake a multi-step process to add content to a wiki, including retrieving the correct uniform resource locator from multiple potential relevant wikis, remembering any necessary login information, opening the correct wiki editor in a Web browser, switching to the source of the content to be added, such as an email client, copying the content, switching back to the wiki editor, finding the appropriate portion of the wiki to add the content, and pasting the copied content to the section. The greater number of interaction steps, information channels to manage, and context switches required from workers is one of the main reasons that most knowledge sharing continues occurs through other channels, such as email, instant messaging, and microblogging.

Some approaches intended to address the shortcomings of standard wikis have been developed. For example, Vispedia, as described in Chan et al., "Vispedia: On-demand Data Integration for Interactive Visualization and Exploration," Proceedings of SIGMOD (ACM), 2009, the disclosure of which is incorporated by reference, provides alternative visual representations of data in tables in wikis. However, Vispedia requires that formal metadata has been previously associated with unstructured content. This requirement relies on the assumption that users will put in the time and effort to associate metadata with content, which is often not the case.

Additionally, Wikilu, as described in Hoffart et al., "An Architecture to Support Intelligent User Interfaces for Wikis by Means of Natural Language Processing," Proceedings of Wikisyms (ACM), 2009, the disclosure of which is incorporated by reference, extends wikis with Natural Language Processing techniques to provide suggestions to a user of where to add content to, or how to rearrange existing content in, a wiki. However, new content must be input manually by the user and the new content is not automatically suggested to the user.

Accordingly, there is a need for to lower user interaction costs with shared information repositories by integrating recommended content within the context of the shared information repositories while allowing for early curation and organization of information through alternative visualizations of content.

SUMMARY

Target and source content are analyzed. Target content from a shared information repository is identified as similar to selected source content and displayed in the context of the source content. The selected source content can be directly added to the target within the source content context.

An embodiment provides a system and method for providing mixed-initiative curation of information within a shared repository. Static content is retrieved from a shared storage associated with a shared information management client. Dynamic content including one or more information items satisfying a similarity threshold with the static content is identified as similar dynamic content. An interactive visualization is generated within the shared information management client from information extracted from the static content and the similar dynamic content. The interactive visualization of the information is linked with the static content and the similar dynamic content. A selection of the information of the similar dynamic content is received from within the visualization. The static content in the shared storage is updated with the similar dynamic content linked with the selected information.

A further embodiment provides a system and method for curating dynamic content. A wiki page is retrieved from a shared storage associated with a wiki application. Dynamic content including one or more information items satisfying a similarity threshold with the wiki page is identified. A recommendation of the dynamic content satisfying the similarity threshold is recommended as similar dynamic content. A visual bridge is generated within the wiki application from the wiki page and the similar dynamic content. Metadata is extracted from each of the wiki page and the dynamic content. An interactive visualization of the metadata is populated. The visualization of the metadata is linked with the wiki page and dynamic content. A selection of the metadata of the dynamic content is received from within the visualization. The wiki page in the shared storage is updated with the dynamic content linked with the selected metadata.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the draw-

DETAILED DESCRIPTION

Figure 1:
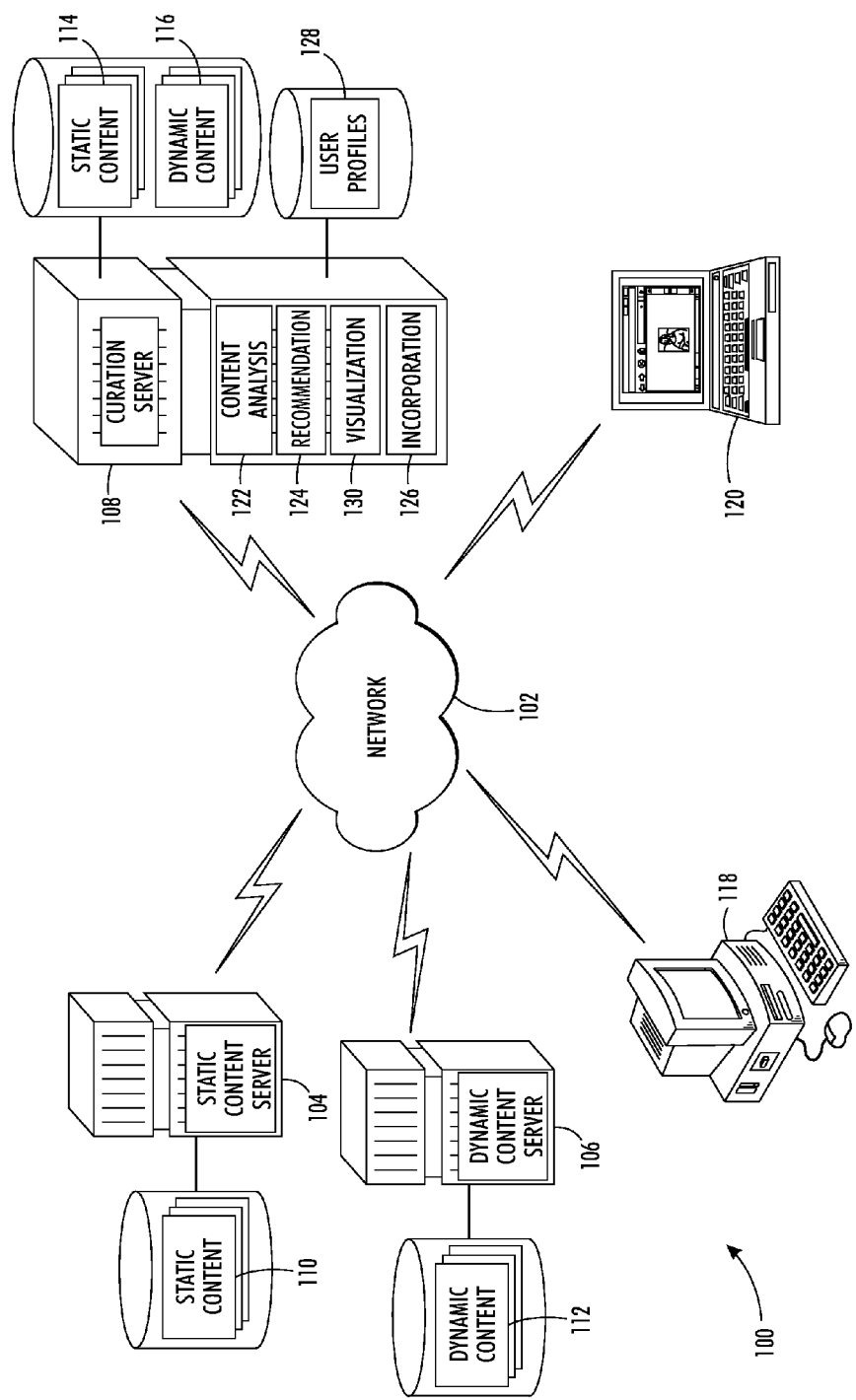
FIG. 1 is a block diagram showing a system for providing mixed-initiative curation of information within a shared repository, in accordance with one embodiment.

High user transaction costs for interacting with, such as organizing, a shared information repository, such a wiki, has resulted in low user adoption rates. A mixed-initiative approach is used for lowering the costs associated with curation of, including updating and organizing, content in a shared web-based information repository. The unique abilities of machine intelligent processing is leveraged to extract similar entities and rapidly manipulate content at large scales and combined with the unique abilities of users for top-down organization of noisy data.

User interaction is combined with machine intelligent processing in two main ways. First, automated functions included in the shared information repository recommend relevant dynamic data next to each page or document in the repository, allowing the user to efficiently transfer the recommended dynamic data into static content or to update the static content using the recommended dynamic data.

Second, metadata is automatically extracted from both static and dynamic content, automatically populates peripheral interactive visualizations with the extracted metadata next to the static and dynamic content, and through the visualizations allows the user to explore relationships, that may not otherwise be visible, between the static and dynamic content, correct metadata, transfer dynamic data into static content, update static content, and organize dynamic content together with static content, and reorganize static content.

The terms static content and dynamic content, as used herein, are used to differentiate the content in the shared information repository and the content identified to potentially add to the shared information repository. For example, the information in a wiki page is relatively "static" in contrast to frequently updated information, such as emails and real simple syndication (RSS) feeds. However, information in a wiki, or other shared information repository, can and does change over time, though, generally, at a slower pace than the designated dynamic content.

Although, as discussed herein, the terms dynamic content and email message and static content and wiki page, respectively, are used interchangeably, dynamic content includes a wide class of data digital items and static content includes a variety of Web-based tools that enable publishing, modifying, and organizing of the digital data items. For example, the dynamic content, or class of digital data items, can include structured data items such as email messages, web feed items in Really Simple Syndication (RSS) or Atom formats, chat or Instant Messaging messages, status updates from social networking sites, web forum or blog posts, and microblogging, for example Twitter, messages. These and other similar digital data items are partially-structured messages that have in common the properties of including general metadata attributes such as author, timestamp, and message body, and, optionally, metadata attributes that are can be specific to the medium such as message title or subject, tags, and recipients. While the embodiments described herein consider the specific example of email messages and RSS items, the embodiments equally apply to this more general class of data items.

Additionally, the class of web-based tools includes shared information repositories containing static content accessible via a network, such as the Internet or a local intranet. Static content includes tools, such as wikis, blogs and discussions forums, Q&A sites, and idea management systems. These and other similar Web-based tools share the properties of allowing a user to add, remove, or edit a data item, such as documents, in the repository, allowing multiple users to collaboratively edit the content in the repository, and allowing simple forms of organization and browsing of the content in the repository in structured sets and subsets, for example, by pages and sections in wikis, thorough threads in blogs and forums, or using tags. The organization and browsing functions are enabled by exploiting the metadata attributes associated with the data items in the repository. The organized sets and subsets of content constitute the 'static content' in the shared information repository. While the embodiments described herein consider wikis as a specific example of shared information repository, the embodiments equally apply to this more general class of Web-based tools with sharing, editing, and organization functions.

Selected dynamic content is transferred to static content in a shared information repository through direct user manipulation. FIG. 1 is a block diagram showing a system 100 for providing mixed-initiative curation of information within a shared repository, in accordance with one embodiment. A digital data communications network 102, such as the Internet, provides an infrastructure for exchange of digital information. Other digital information exchange infrastructures, for instance, a non-public corporate enterprise network, are possible. The network 102 provides interconnectivity to diverse and distributed information, or content, sources and users that respectively supply and consume the digital information. Users can access and upload content, such as emails, Web pages, posted articles, and the like to the network 102, which are maintained as a distributed data corpus through one or more static content servers 104, dynamic content servers 106, curation servers 108, and other data repositories that serve as content sources. These sources respectively serve content 110, 112, 114, 116 and other information to users that access the network 102 through one or more user devices 118, 120. User devices can include desktop personal computers 118, laptop personal computers 120, and handheld devices, such as mobile telephones and mobile Internet devices (not shown).

Content 110, 112, 114, 116 is created by users or automatically generated, and can include emails, news content, wiki pages, and documents in content management systems. Other types of content 110, 112, 114, 116 are possible. Content 110, 112, 114, 116 can be received directly on user devices 118, 120, for user review via a user interface from a static content server 104 or content from many sources can be aggregated, cached, and accessed by user devices 118, 120, from other servers 108. Generally, static content 110, 114 is from a shared information repository, such as a wiki page from a wiki, while dynamic content 112, 116 can be from varied sources, such as emails or mailing lists, information items received through real simple syndication (RSS) feeds, instant messages, microblogging messages, such as tweets from Twitter, and calendar events. Other types of content are possible. Dynamic content 112, 116 is displayed within, and shared to the static content 110, 114, within a shared information management client, such as a wiki clients. Other shared information management clients are possible.

A user selects static content 110, 114 displayed on a user device 118, 120. Subsequently, a curation server 108 identifies dynamic content 112, 116 similar to the selected static content 110, 114 and integrates the dynamic content 112, 116 into the static content 110, 114 under user control. The curation server 108 is interconnected to the user devices 118, 120, static content server 104, and dynamic content server 106 via the network 102, and includes a content analysis module 122, a recommendation module 124, a visualization module 130, and an incorporation module 126. The static content 110, 114 and dynamic content 112, 116 can be retrieved, analyzed, indexed, and cached for later retrieval by the curation server 108. The static content 110, 114 can be obtained directly from the shared information repository, retrieved from a cached copy, or generated by the user on a the user device 118, 120. Likewise, the dynamic content 112, 116 can be obtained directly from the dynamic content server 106 or crawled and cached for later retrieval by the curation server 108.

The content analysis module 122 analyzes the content of the static content 110, 114 and dynamic content 112, 116 using text mining. For example, types of text mining can include most probable topic distribution using the latent Dirichlet allocation model, syntactic tree using an automatic syntax analyzer, and named entities using a named entity recognizer. Other ways of text mining are possible. The content analysis module 122 also extracts and analyzes information, such as, metadata from the static content 110, 114 and dynamic content 112, 116. The metadata can be extracted using categorization or clustering techniques, to identify high-level categories or features for the dynamic content. For example, the dynamic content can be categorized into "important" or "unimportant" status. Other types of information extraction are possible. Once static content 110, 114 is selected, the recommendation module 124 identifies dynamic content 112, 116 similar to the selected static content 110, 114.

Figure 3:
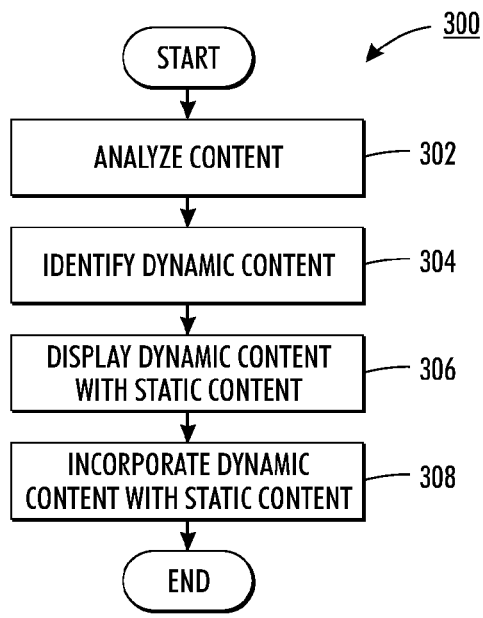
FIG. 3 is a flow diagram showing a method for providing mixed-initiative curation of information within a shared repository, in accordance with one embodiment.

The visualization module 130 displays the identified dynamic content 112, 116 within the context of the selected static content 110, 114, as further described below with reference to FIG. 3. Additionally, the visualization module 130 displays one or more visualizations of the extracted metadata of the static content 110, 114 and dynamic content 112, 116, as further discussed below with reference to FIG. 4.

After the user has decided where to place the dynamic content 112, 116 within the static content 110, 114, the incorporation module 126 supports direct user manipulation of the dynamic content 112, 116 within static content 110, 114. For example, the user can drag and drop the selected dynamic content 112, 116 directly into the displayed static content 110, 114 from within the static content 110, 114 context. The selected dynamic content 112, 116 and the existing static content 110, 114 can then be edited or otherwise curated by the user. Once finalized the user can confirm the changes to the static content 110, 114, which is then reflected in the static content 110, 114 to other users.

Additionally, a user profile 128 is generated and stored for each user. The user profile 128 stores user preference information such as user account and profile information, access control settings, session data, and preferences. The user profile can also store contextual information for each user interaction across the static content 110,114 and dynamic content 112,116. For example, whether a user utilizes recommended dynamic content 112, 116 for insertion into selected static content 110, 114 is stored and used to adapt later recommendations of dynamic content 112, 116 for adding to similar static content 110, 114 in the future.

In general, each user device 118, 120, is a Web-enabled device that executes a wiki client, Web browser, or similar application, which supports interfacing to and information exchange and retrieval with the servers 104, 106, 108. Both the user devices 118, 120, and servers 104, 106, 108, include components conventionally found in general purpose programmable computing devices, such as a central processing unit, memory, input/output ports, network interfaces, and non-volatile storage, although other components are possible. The devices 104, 106, 108, 118, 120, can include one or modules for carrying out the embodiments disclosed herein.

The modules can be implemented as a computer program or procedure written as source code in a conventional programming language and presented for execution by the central processing unit as object or byte code. Alternatively, the modules could also be implemented in hardware, either as integrated circuitry or burned into read-only memory components. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components. Moreover, other content sources in lieu of or in addition to the servers 104, 106, and other devices, in lieu of or in addition to user devices 116, 118, are possible.

Figure 2:
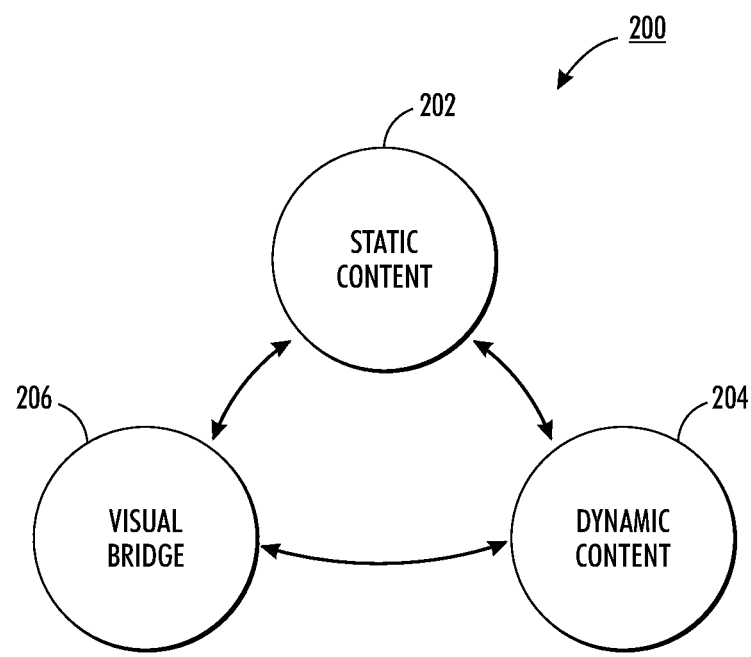
FIG. 2 is a data flow diagram showing user interface components for providing mixed-initiative curation of information within a shared repository, in accordance with one embodiment.

Dynamic 112, 116 and static content 110, 114 are presented visually proximal to one another to facilitate efficient selection, addition, and organization of dynamic content 112, 116 into the static content 110, 114. FIG. 2 is a data flow diagram 200 showing user interface components for providing mixed-initiative curation of information within a shared repository, in accordance with one embodiment. The user interface of the system 100 includes three main components, static content 202, dynamic content 204, and a visual bridge 206. The static content 202, dynamic content 204, and visual bridge 206 interoperate with one another and a user action's within one of the components can affect the content displayed in one or both of the other components.

The static content 202, such as wiki page, is from a shared information repository, such as a wiki, and the dynamic content 204 and visual bridge 206 are displayed within the context of the static content 202. The static content 202 has been previously added, or published, to the shared information repository. The dynamic content 204 is information received from sources outside, and therefore not yet published to, the static content 202, such as RSS feeds, social networking and microblogging updates, and emails. The dynamic content 204 displayed is identified based on the content's 204 similarity to the static content 202 chosen. The user can then add chosen dynamic content 204 though direct manipulation, such as drag and drop and faceted filtering, at a desired location within the static content. Additionally, recommendations of locations within the static content 202 for the dynamic content can be displayed to the user as well, such as further described below with reference to FIG. 3.

The visual bridge 206 populates one or more visualizations of metadata from the static content 202 and the dynamic content 204. The visualizations allow the user to view specific mappings between the static content 202 and the dynamic content 206 to further aid in the selection, addition, and organization of dynamic content 204 to the static content 202. The visualizations in the visual bridge 206 are coordinated with the dynamic content 204 displayed. In one embodiment, filtering, recommendations, and visualizations of the static content 202 and dynamic content 204 are based on metadata previously associated with the content 202. In a further embodiment, metadata can be automatically extracted from the content of the dynamic content 204 and the static content 206, and then related and clustered across the static content 202 and dynamic content 204 through semantic analysis, such as described further below with reference to FIG. 4. The metadata can then be further edited or extended by the user as needed.

Dynamic content 112, 114 is displayed and manipulated directly within the context of static content 110, 114. FIG. 3 is a flow diagram showing a method for providing mixed-initiative curation of information within a shared repository, in accordance with one embodiment. Content 110, 112, 114, 116 is received from content sources 104, 106, 108. Static content 110, 114 can be received from a shared information repository, such as a static content server 104 or curation server 108. Dynamic content 112, 116 can be received from a dynamic content server 106 or curation server 108. Other ways of receiving content 110, 112, 114, 116 are possible.

Static content 110, 114 is selected by the user and then analyzed by the system 100 (block 302). The static content 110, 114 can consist of an individual item of content, such as a single wiki page or a subset of content, such as a section of a wiki page. Other types of static content 110, 114 are possible. In addition to static content 110, 114, dynamic content 112, 116 can be received and analyzed dynamically, or cached for later comparison. In one embodiment, the content 110, 112, 114, 116 is analyzed using a textual, or content mining technique, such as text categorization, clustering, concept and entity extraction, and document summarization. Some possible applications are the generation of a list of people involved in a discussion, summarization of project status, and extraction of references in an exchange about prior art on a specific subject. The content analysis is then stored by the curation server 108. A user can select particular previously created static content 110, 114 or created new static content 110, 114, such as generating a new wiki page, which is then dynamically analyzed. Dynamic content 112, 116 similar to the selected static content 110,114 is identified (block 304) based on selection criteria. In one embodiment, relevant dynamic content 112, 116 can be identified and recommended to the user based on the similarity of the selected static content 110, 114 and dynamic content 112, 116. The selected static content 110, 114 is used to generate a query to define the scope of the dynamic content 112, 116 displayed within the context of the static content 110, 114. For example, tf-idf or BM25 can be used in conjunction with a standard vector space model together with cosine similarity to determine the similarity between the static content 110, 114 and the dynamic content 112, 116. More advanced text similarity approaches can be used, such as distance between low-dimensional representations of the content computed using Latent Semantic Indexing, Probabilistic Semantic Indexing, or Latent Dirichlet Allocation inference algorithms. Other similarity criteria are possible.

In one embodiment, the dynamic content 112, 116 identified as most similar to the static content 110, 114 is recommended. For example, the three email messages identified that are most similar to a selected wiki page are recommended to the user. In a further embodiment, the dynamic content 112, 116 must meet a threshold, such as percentage of similiarty with the static content 110, 114, to be recommended. For example, the threshold can be determined using a probabilistic classifier, such as logistic regression. The threshold can then be set to a probability of, for example, 50% of being relevant content for insertion. Depending on the user preferences or usage habits, this threshold can be changed accordingly.

In a further embodiment, the similarity criteria and recommendations are improved over time by learning from user interactions with the system 100. For example, linear regression is used on features, such as subject mapping, date proximity, author mapping, to generate a personalized ranking of relevant dynamic content 112, 116 for the user. For example, if a user has recently modified, such as editing, a selected wiki page and is also the author of a new email, then the email is moved up on the ranking of similarity associated with the selected wiki page.

In a further embodiment, stored unpublished dynamic content 112, 116 can be associated with particular static content 110, 114 as received. In a still further embodiment, a tagging system can be used which associates one or more tags with dynamic content 112, 116 that can be displayed as recommended dynamic content 112, 116, such as described in commonly-assigned U.S. patent application, entitled "System and Method for Content Tagging and Distribution Through Email," Ser. No. 12/699,791, filed Feb. 3, 2010, pending, the disclosure of which is incorporated by reference.

Multiple levels of recommendations are given based on user action. For example, a user can select a wiki page and then receive recommendations as to most relevant dynamic content 112, 116 based on the content of the entire wiki page. Additionally, if a user selects particular dynamic content 112, 116, such as a single email message, the most relevant section within the wiki page is displayed. Most relevant represents the dynamic content most likely to be selected by the user.

The identified dynamic content 112, 116 is displayed with the static content 110, 114 (block 306). The recommended dynamic content is displayed to the user so the user can directly contribute the dynamic content 112, 116 to the static content 110, 114 without switching display contexts, as described further below beginning with FIG. 6. For example, email dynamic content 112, 116 is displayed within a wiki client, such as MediaWiki, via a wiki plugin or extension. In one embodiment, a summary view of the dynamic content 112, 116 is displayed. The user can then drill down into the emails by selecting, or hovering or mousing over, the summary to view more dynamic content 112, 116 in more detail. In a further embodiment, the entire contents of the dynamic content are automatically displayed.

The user can filter unwanted dynamic content 112, 116 from being displayed to remove unwanted content to aid in the selection process. Faceted filtering is used to leverage metadata associated with the dynamic content 112, 116, such as author date, and tags and activity records in the revision history of the selected static content 112, 116, such as editor, date of edit, and type of activity, such as further described below with reference to FIG. 5. Other filters are possible.

The selected dynamic content 112, 116 can then be incorporated into the static content 110, 114 (block 308). The user can directly add the dynamic content 112, 116 to the static content 110, 114 through manipulation of the user interface. In one embodiment, after selecting dynamic content 112, 116 from an email message, the user can drag the dynamic content 112, 116 to the displayed static content 110, 114 and drop the dynamic content 112, 116 at the position desired. The user can then edit, reformat, reposition, or otherwise change the dynamic content 112, 116 before confirming placement of the dynamic content 112, 116. If the user selects multiple items of dynamic content 112, 116, the multiple items can be incorporated into the static content 110, 114 as a batch or group.

In a further embodiment, the user can request a recommendation of where selected items of dynamic content 112, 116 could be placed within a portion of the static content 110, 114, though the user interface, for example, by clicking on a "recommend" button. In response, the system 100 scrolls in the static content to the location where the selected dynamic content 110, 114 would best fit, previews the recommendation in this context, and allows the user to accept, reject, or edit the recommendation.

Additionally, a new section heading or new page can be created within the static content 110, 114 by the user and the dynamic content 112, 116 added accordingly. Once confirmed, the dynamic content 112, 116 is added to the static content 110, 114 and the wiki page displays the added content to all users, as described further below with reference to FIG. 6.

In a further embodiment, dynamic content 112, 116 can be contributed to static content 110, 114 asynchronously by emailing selected dynamic content 112, 116 to an email address associated with a wiki page, such as described in commonly-assigned U.S. patent application, entitled "System and Method for Content Tagging and Distribution Through Email," Ser. No. 12/699,791, filed Feb. 3, 2010, pending, the disclosure of which is incorporated by reference. Prior to adding the dynamic content 112, 116 to the static content 110, 114 the user receives a feedback email message. The feedback message allows a user to review, accept, or cancel the proposed contribution. The user can contribute a portion of or and entire email message or a group of email messages to the static content 110, 114.

Figure 4:
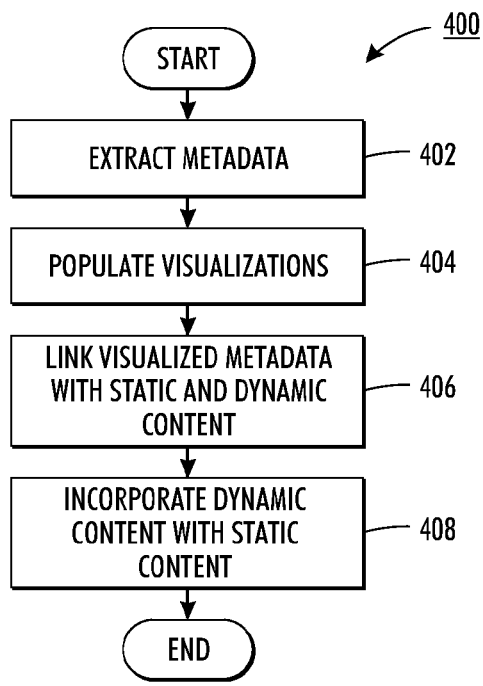
FIG. 4 is a flow diagram showing a method for providing mixed-initiative curation of information within a visual bridge, in accordance with one embodiment.

Information extracted from the static content 110, 114 and the dynamic content 112, 116 is displayed through one or more interactive visualizations bridging the static content 110, 114 and the dynamic content 112, 116. FIG. 4 is a flow diagram 400 showing a method for providing mixed-initiative curation of information within a visual bridge, in accordance with one embodiment. Information, such as metadata, associated with static content 110, 114 and dynamic content 112, 116 is extracted (block 402). Metadata extracted can include dates, people or organizations, locations, and topics. In one embodiment, the metadata extracted is identified from metadata previously associated with the content 110, 112, 114, 116. For example, the dynamic content 112, 116, the metadata can include manually added tags, author, and post date and time. For the static content 110, 114, the metadata can include author or contributor, edit date and time, and type of edit, such as an insertion or deletion. Other types of metadata are possible.

In a further embodiment, semantic analysis is applied to extract metadata from the dynamic content 112, 116 and static content 110, 114. The text of the dynamic content 112, 116 is parsed using a natural-language processing engine to structure and format dynamic content 112, 116. For example, ANNIE, the entity extractor component of General Architecture for Text Engineering (GATE) framework, as described in Cunningham et al., "GATE: A Framework and Graphical Development Environment for Robust NLP Tools and Applications," Proceedings of the 40th Anniversary Meeting of the Association for Computational Linguistics (ACL '02), 2002, the disclosure of which is incorporated by reference, can be used to extract desired entities, such as dates, people, organizations, and locations. Other entities are possible.

Initially, the type of content is determined. For example, whether a piece of dynamic content 112, 116 is a publication reference, a biography of a person, news, meeting information, or company description is identified. Next, metadata specific to the identified type of dynamic content 112, 116 is extracted. For example, if the dynamic content 112, 116 is a publication reference, the title, author, publisher, data published, and uniform resource locator are identified. Further, a user can interactively correct or complete the metadata extracted. The corrections are propagated to each of the visual bridge visualizations and dynamic content 112, 116 displayed. Moreover, any changes can be incorporated into the system 100 to improve later semantic extraction.

Once extracted, the metadata is populated into one or more metadata visualizations (block 404). Each visualization is sortable and filterable based on the extracted metadata. Further, the metadata from the static content 110, 114 and dynamic content 112, 116 are visually distinguished in the visualization to aid the user in deciding which dynamic content 112, 116 to add into the static content 110, 114. Additionally, the extracted metadata can be associated with the dynamic content 112, 116. The user can display and edit the extracted metadata by hovering over, or otherwise selecting, the dynamic content 112, 116 with a mouse, such as further described below with reference to FIG. 8.

The extracted metadata is linked in the visualization with the static content 110, 114 and the dynamic content 112, 116 (block 406). Specifically, the metadata extracted from the dynamic content 112, 116 are associated with the text that contains the metadata. The metadata extracted from the static content 110, 114 is associated with the section of the static content that the metadata is from. Additionally, users can manually specify the content, such as text, associated with extracted metadata.

As a user selects and filters the dynamic content 112, 116 displayed, the metadata displayed in the visual bridge is updated accordingly. Further details about a specific item in the visual bridge can be displayed within the visual bridge by hovering over the item with a mouse. When a user selects an item in the visual bridge, the respective display of static content 110, 114 or dynamic content 112, 116 scrolls, or otherwise, moves to display the corresponding source of metadata in the static content 110, 114, or dynamic content 112, 116.

Selected dynamic content can be incorporated into the static content 110, 114 (block 408). As each piece of metadata is linked to the dynamic content 112, 116 from which the metadata was extracted, the metadata can be used as "handles" to manipulate the dynamic content 112, 116 and static content 110, 114. For example, a specific metadata date can be selected in the visual bridge.

Dynamic content 112, 116 associated with selected metadata items can be added to the static content 110, 114 from within the visual bridge. For example, a user can select through the mouse one or more metadata items corresponding to dynamic content 112, 116 and click a button in the user interface to add a new section, including title, to the static content 110, 114 via a dialog window.

Additionally, static content 110, 114 already displayed in the wiki page can be reorganized through the visual bridge. For example, sections can be reordered or a new section added by selection of the associated metadata within the visual bridge. For example, the user can select through manipulation of the mouse one or more metadata items corresponding to static content 110, 114 and clicks a user interface button to name and add a new section to the static content 110, 114 via a dialog window, while specifying that the content 110, 114 be removed from the original sections. Further, combinations of operations can also be performed. For example, the user can reorganize part of the static content 110, 114 already displayed in the wiki page while also including also new dynamic content 112, 116. This provides simultaneous low-cost reorganization and updating of the static content 110, 114.

Figure 5:
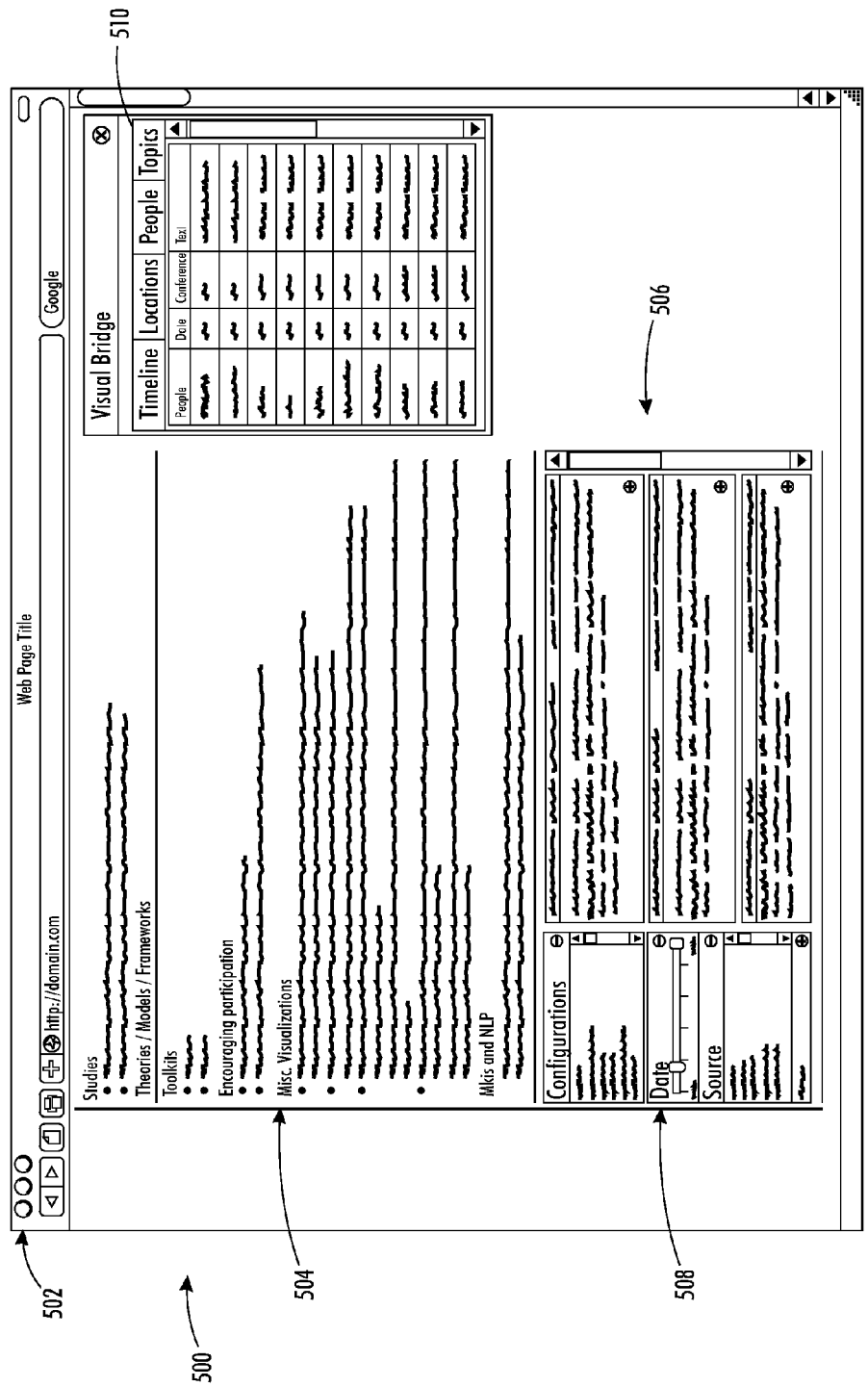
FIG. 5 is a screen shot diagram showing, by way of example, a user interface for providing mixed-initiative curation of information within a shared repository.

Dynamic content 112, 116 is displayed within static content context for efficient user contribution and curation. FIG. 5 is a screen shot diagram 500 showing, by way of example, a user interface 502 for providing mixed-initiative curation of information within a shared repository. User interface 502 can be implemented within a wiki client enhanced with a wiki extension. In a further embodiment, the user interface can be implemented in a Web-based form, such as in a Web browser, or any other type of software interface. The user interface 502 includes static content 110, 114 from a shared information repository and dynamic content 112, 116. For example, the static content 110, 114 can be a wiki page 504 selected by the user and the dynamic content 112, 116 can be incoming emails 506 received by the user. Other types of static content 110, 114 and dynamic content 112, 116 are possible.

The user interface 502 also includes a faceted filtering bar 508 for filtering dynamic content 112, 116 based on selected facets, such as contributors, date of contribution, and source. Other facets are possible. The facets are generated from extracted metadata. Dynamic content 112, 116 displayed can be filtered by the user by selecting or deselecting content within the faceted filtering bar 508. For example, dynamic content 112, 116 by a particular contributor can be removed from display by deselecting the contributor. The dynamic content 112, 116 can also be searched through a search query element.

Additionally, the user interface includes a visual bridge 510 that is populated with extracted metadata from the static content 110, 114 and dynamic content 112, 116. The visual bridge presents the metadata in a number of visualizations, including by timeline, location, people, and topic, such as discussed further below with reference to FIG. 7. Other visualizations are possible.

Figure 6:
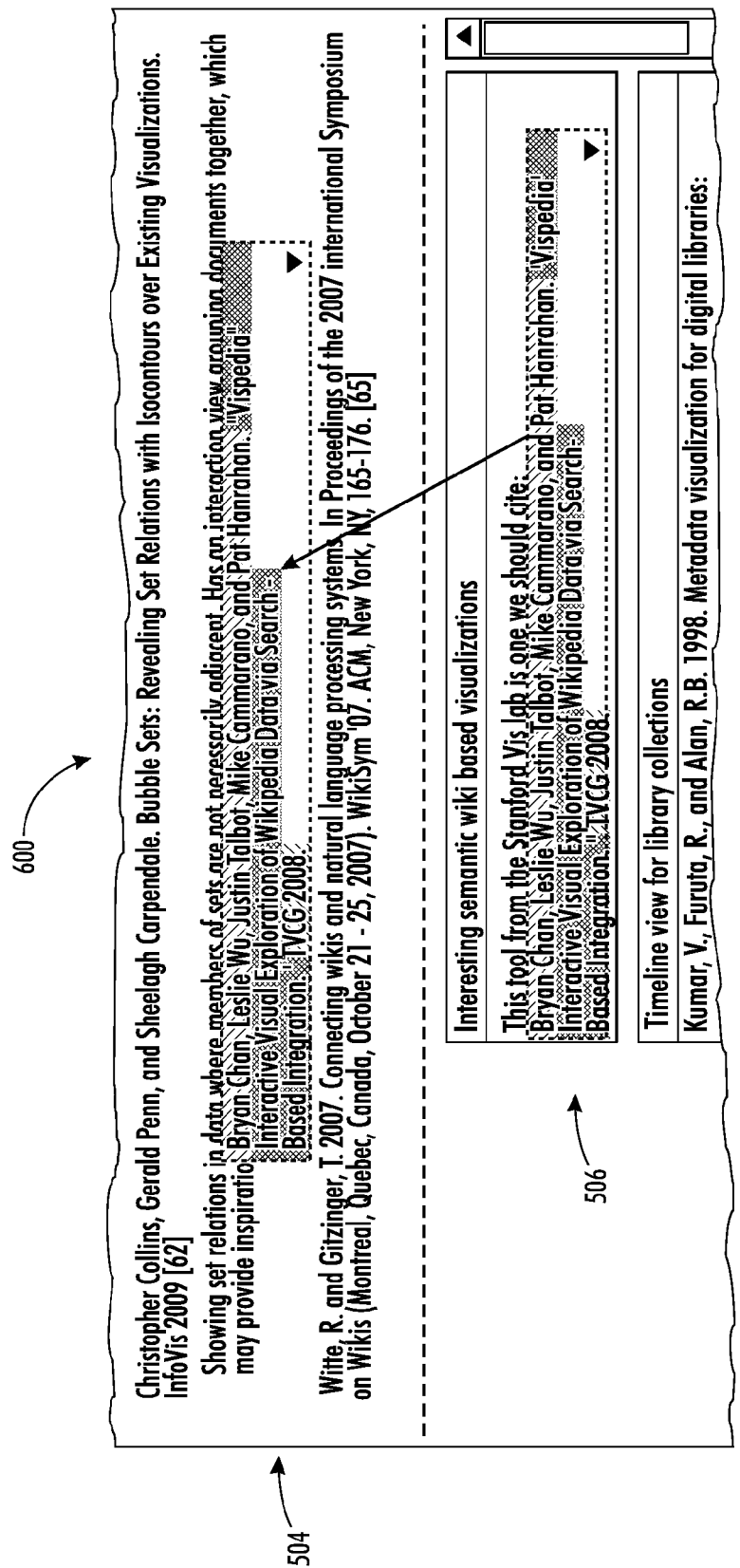
FIG. 6 is a screen shot diagram showing, by way of example, a detail view of the user interface of FIG. 5 upon user selection and placement of dynamic content.

Dynamic content 112, 116 is selected by the user for contribution to static content 110, 114. FIG. 6 is a screen shot diagram 600 showing, by way of example, a detail view of the user interface 502 of FIG. 5 upon user selection and placement of dynamic content 112, 116. The user can select dynamic content 112, 116 by interacting with the user interface, such as by selecting or highlighting the dynamic content 112, 116 with a mouse. The user can also create dynamic content 112, 116, for example, by generating an outgoing email message (not shown). Dynamic content 112, 116 can be integrated with static content 110, 114 by the user through interacting with the user interface 502, for example, by dragging and dropping the selected dynamic content 112, 116 from the email message 506 to the desired position within the static content 110, 114 of the wiki page 504.

Once placed, the user can confirm the correct placement of the dynamic content 112, 116, cancel the addition, move the dynamic content 112, 116 to another position, or otherwise edit, the dynamic content 112, 116. For example, the user has selected a portion of content in the body of the email message 506 and dragged the selected dynamic content 112, 116 to a desired location in the static content 110, 114 of the wiki 504. Additionally, a recommendation for a particular section within the wiki page 504 for the selected content of the email message 504 can be displayed to the user, as further discussed below with reference to FIG. 7.

After confirmation by the user, the dynamic content 112, 116 of the email message 506 contributed is reflected in the wiki page 504 and is available for display to other users. In one embodiment, the added dynamic content 112, 116 is displayed in the same format as the static content 110, 114. In a further embodiment, the dynamic content 112, 116 is displayed differently, such as through a different font, font size, or color.

Figure 7:
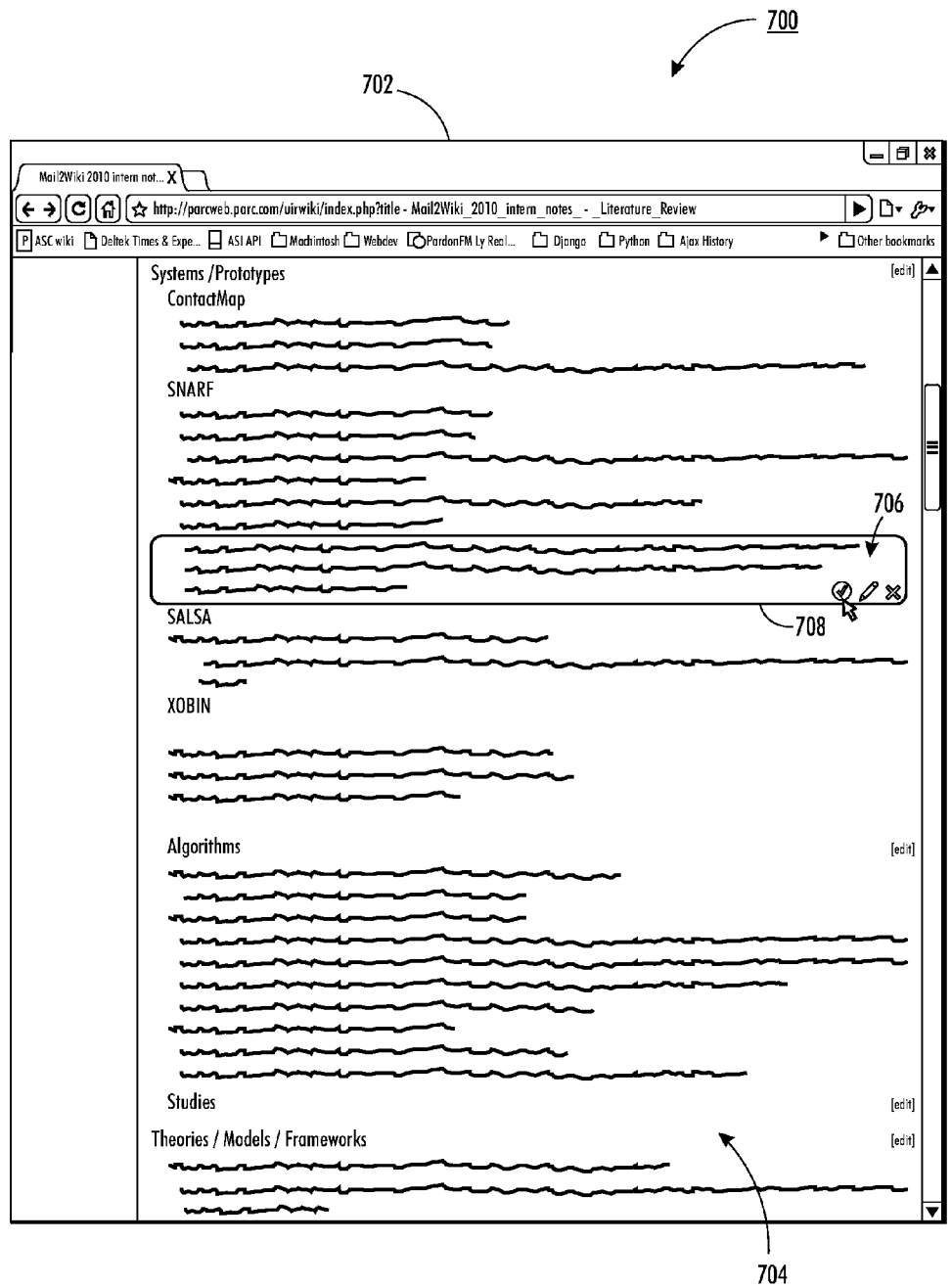
FIG. 7 is a screen shot diagram showing, by way of example, a user interface showing recommended placement of dynamic content.

Recommendations for placement position of selected dynamic content 110, 114 within the static content 112, 116 are generated for the user. FIG. 7 is a screen shot diagram 700 showing, by way of example, a user interface 702 showing recommended placement of dynamic content 112, 116. The dynamic content 112, 116 selected, such as an email message 706, by the user is compared to the static content 110, 114, such as a wiki page 704, and the most relevant section within the wiki page 704 for the selected email 706 is recommended to the user. The recommended section is brought to the attention of the user through the user interface 702. In one embodiment, the selected email message 706 is placed at the recommended position within the wiki page 704 as a preview 708, where the user can then confirm, cancel, or edit the dynamic content 112, 116. In a further embodiment, the recommended section of the wiki page 704 based on the selected dynamic content 112, 116 of the email message 404 can be highlighted to the user, such as through a broken line around the section (not shown). Other ways to highlight the recommended section are possible, including, for example, different font size, and color.

Figure 8:
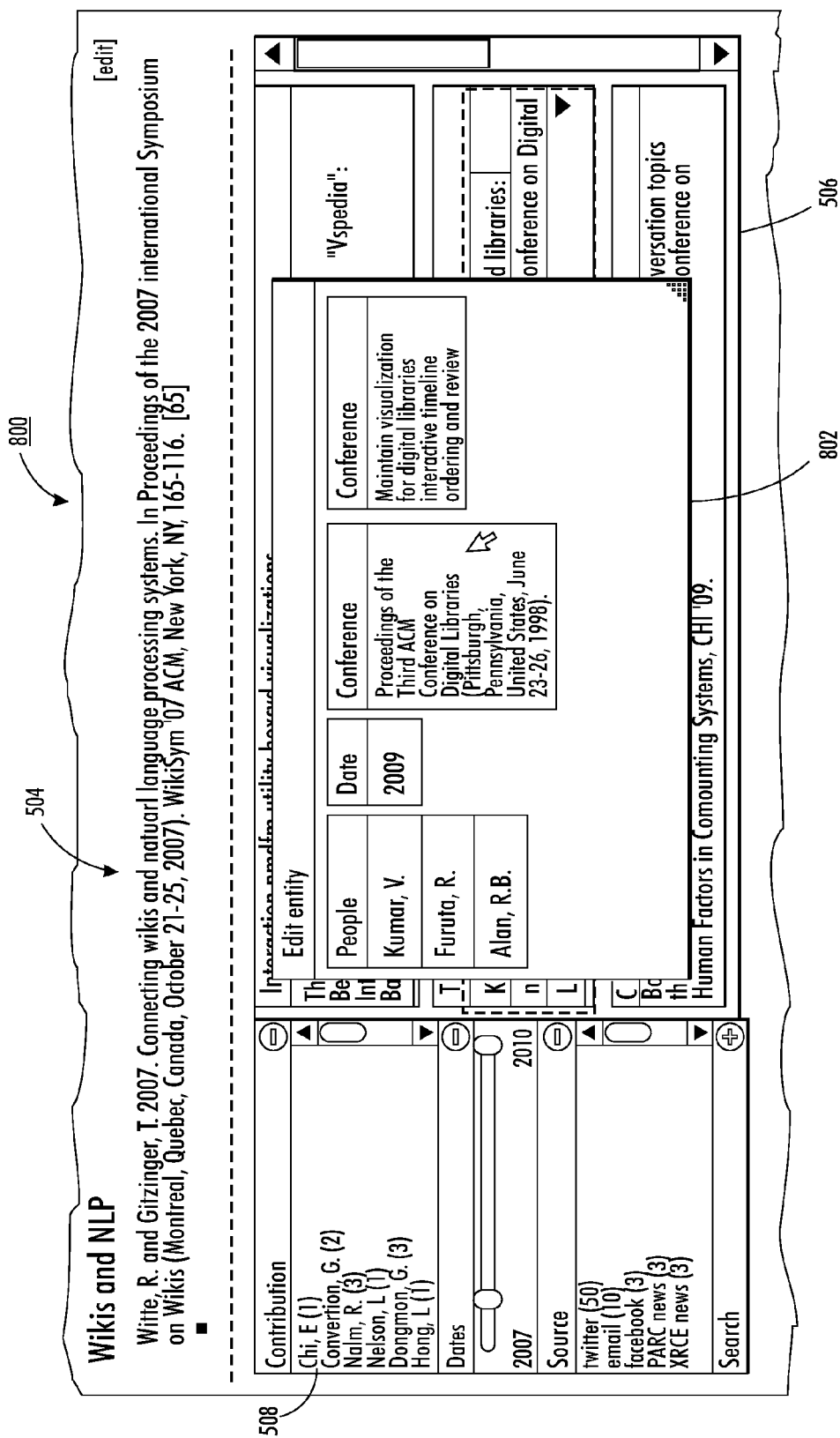
FIG. 8 is a screen shot diagram showing, by way of example, a detail view of the user interface of FIG. 5 for editing dynamic content.

Dynamic content 112, 116 can be modified prior to placement within the static content 110, 114. FIG. 8 is a screen shot diagram 800 showing, by way of example, a detail view of the user interface 502 of FIG. 5 for editing dynamic content. Once the user has selected dynamic content 112, 116 from the email message 506, the user can make changes to the dynamic content 112, 116, such as editing or completing the extracted metadata, such as described above with reference to FIG. 4. The changes can be conducted within an editing box 802 containing the dynamic content organized based on metadata type. Other ways of editing the static content are possible.

Alternative visualizations of metadata can reveal associations between the dynamic content and static content that may have not been readily apparent to the user. FIGS. 9A-D are screen shot diagrams 900 showing, by way of example, different visualizations within the visual bridge 510. The visual bridge 510 provides multiple visualizations of information, such as metadata, extracted from the static content 110, 114 and dynamic content 112, 116. The metadata extracted can be previously associated with the content or extracted through semantic analysis, such as described above with reference to FIG. 4. Types of visualizations include a timeline view FIG. 9A, a location view FIG. 9B, a person/organization view FIG. 9C, and a topics view FIG. 9D. Other visualizations are possible.

FIGS. 9A-D show visualizations of metadata associated with static content 110, 114 and dynamic content 112, 116 regarding research conferences. The visual bridge 510 displays the static content 110, 114 and dynamic content 112, 116 differently within the visualizations to aid the user in comparing and organizing the content. The timeline view FIG. 9A displays dates related to the research conferences, for example, submission deadlines and dates the conferences occur. Additionally, the dates displayed are adjustable through a filter. A user can compare dates of conferences efficiently and determine if certain dynamic content 112, 116 should be added to the static content 110, 114.

Figure 9A:
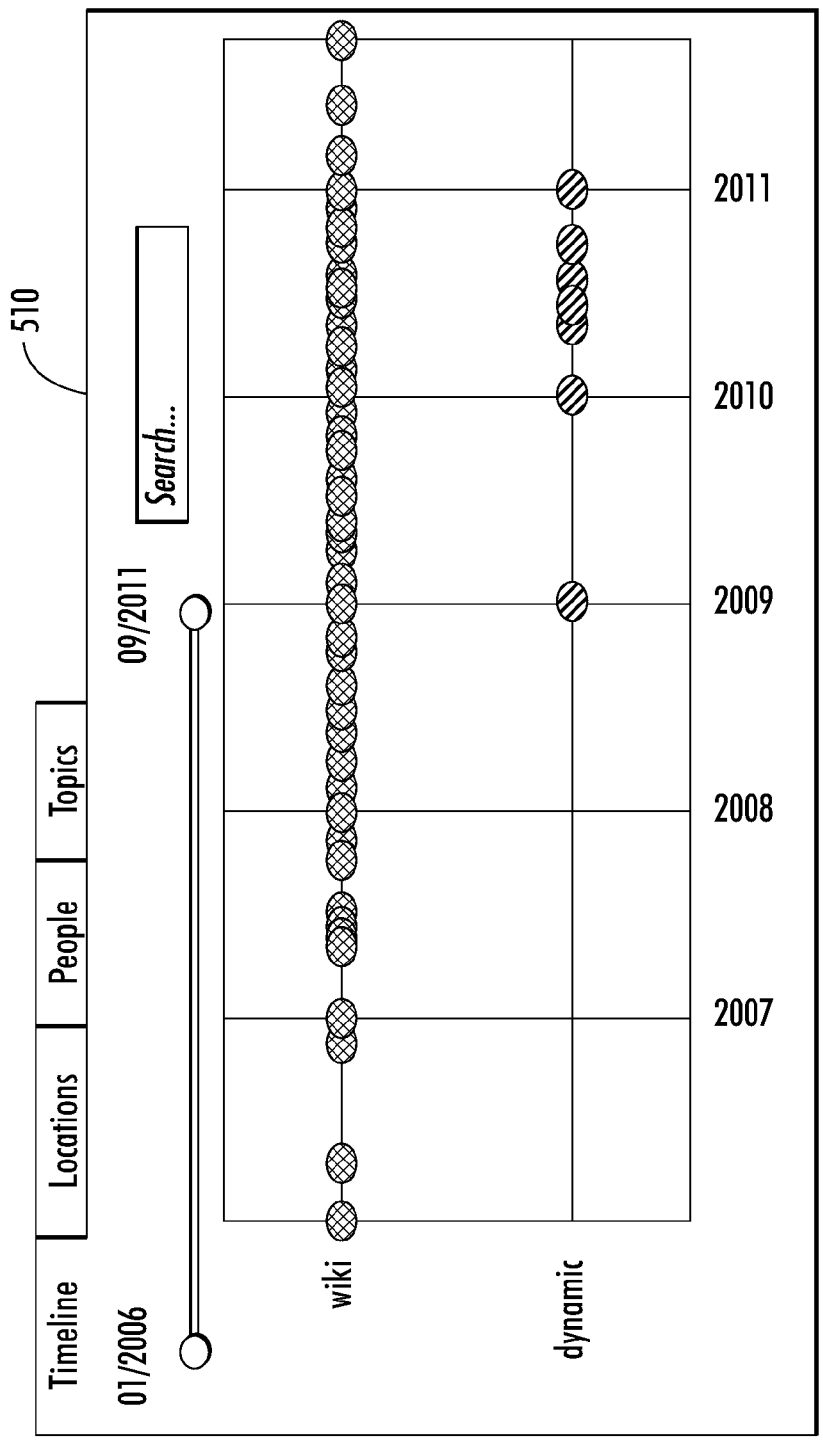
FIGS. 9A-D are screen shot diagrams showing, by way of example, different visualizations within the visual bridge.
Figure 9B:
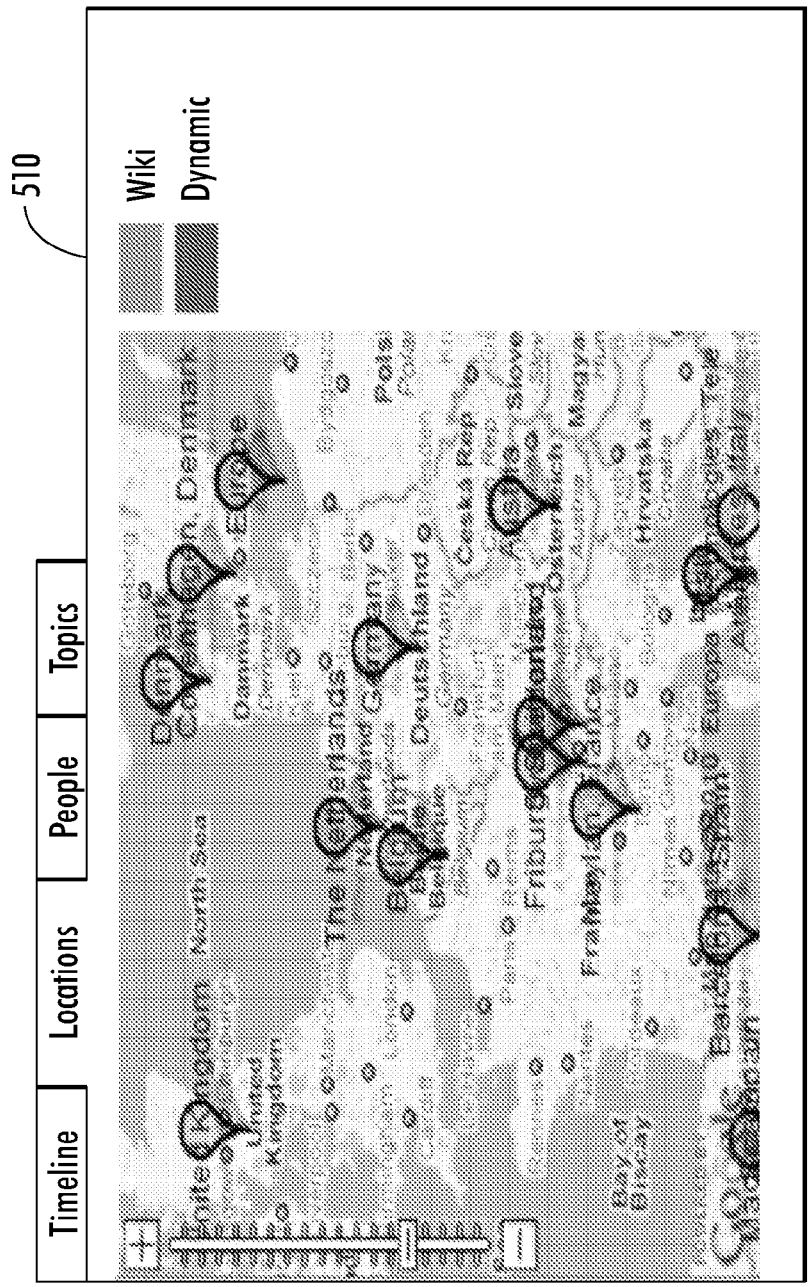
Figure 9C:
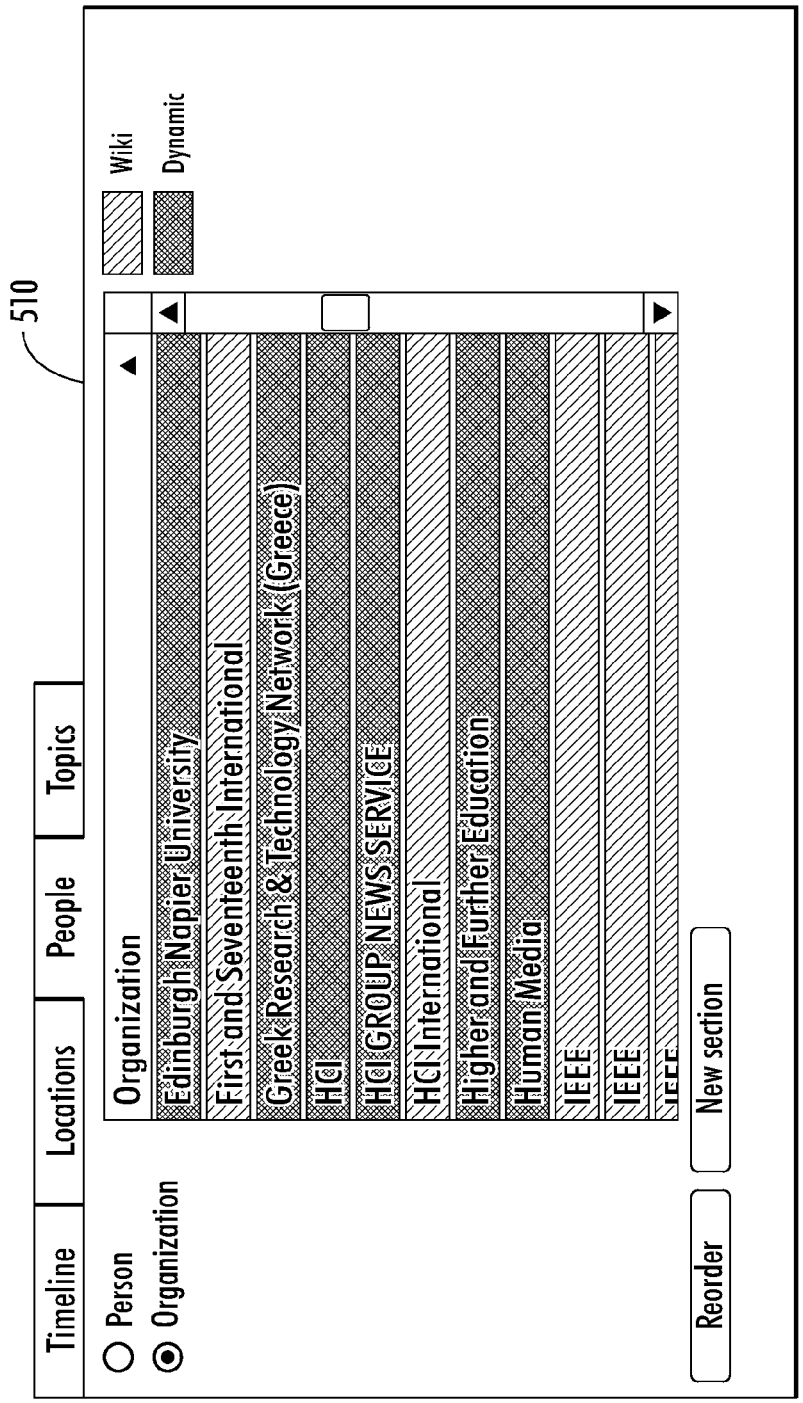
Figure 9D:
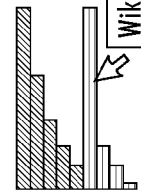

The location view FIG. 9B displays locations associated with the conferences, such as the location of the conferences. The user can identify conflicts in the information between the static content 110, 114 and dynamic content 112, 116, indicating that the static content 110, 114 may need to be augmented with the updated information in the dynamic content 112, 116. The person/organization view FIG. 9C displays extracted information regarding people or organizations associated with the static content 110, 114 and dynamic content 112, 116, for example, people to submit conferences papers to and organizations sponsoring the conference. The person/organization view may revel to the user connections between organizations that the user may have otherwise missed. The topic view FIG. 9D displays topics extracted from the static content 110, 114 and dynamic content 112, 116. The topics can be displayed in a list or cluster format. The topics view FIG. 9D can reveal relationships between information in the static content 100, 114 and dynamic content 112, 116.

If the user decides make any changes, metadata associated with the static content 100, 114 and dynamic content 112, 116 can be edited within the visual bridge and propagated to the other visualizations and static content 100, 114 and dynamic content 112, 116. Moreover, static content 110, 114 can be reorganized and dynamic content 112, 116 can be added to the static content 110, 114 from within the visual bridge, such as described above with reference to FIG. 4.

Additionally, a particular visualization can be automatically displayed to the user. In one embodiment, the preferred visualization is displayed based on user-defined presets. In a further embodiment, the preferred visualization is determined automatically, such as by using heuristics. For example, the number of entities extracted for each type, such as dates, people, locations, and topics, are determined and the visualization with the most entities is displayed. Other ways to determine which visualization to display are possible.

While the invention has been particularly shown and described as referenced to the embodiments thereof, those skilled in the art will understand that the foregoing and other changes in form and detail may be made therein without departing from the spirit and scope of the invention.

What is claimed is:

1. A system for providing mixed-initiative curation of information within a shared repository, comprising:
   a processor to execute modules, comprising:
   a content module to retrieve static content published to a shared storage associated with a shared information management client;
   a recommendation module to identify unpublished dynamic content separate from the shared storage comprising one or more information items satisfying a similarity threshold with the published static content;
   an extraction module to extract entities, each comprising at least one of a date, location, name, person, organization, and topic, from the published static content and the unpublished dynamic content;
   a visualization module to generate within the shared information management client, an interactive visualization comprising mappings between the published static content and the unpublished dynamic content based on the extracted entities and that is separate from the published static content and the unpublished dynamic content;
   a link module to link the interactive visualization of the entities with the published static content and the unpublished dynamic content;
   an edit module to edit from within the visualization at least one of the extracted entities and to propagate the edit to the unpublished dynamic content or the published static content from which the edited entity was extracted;
   a selection module to receive a selection of one or more of the entities of the unpublished dynamic content from within the visualization; and
   an incorporation module to incorporate the unpublished dynamic content associated with the selected entities into the published static content in the shared storage.

2. A system according to claim 1, further comprising:
   a display module to display the one or more information items visually proximate to the published static content within the shared information management client; and
   an item selection module to receive a selection of at least one of the one or more information items, wherein the incorporation module further updates the published static content in the shared storage with the at least one of the one or more information items.

3. A system according to claim 1, further comprising:
   a data population module to populate the interactive visualization with the extracted entities from the published static and the unpublished dynamic content.

4. A system according to claim 1, wherein the visualization is a timeline.

5. A system according to claim 1, further comprising selecting the interactive visualization from a plurality of visualizations based on the extracted entities.

6. A computer-implemented method for providing mixed-initiative curation of information within a shared repository, comprising:
   retrieving static content published to a shared storage associated with a shared information management client;
   identifying unpublished dynamic content separate from the shared storage comprising one or more information items satisfying a similarity threshold with the published static content;
   extracting entities, each comprising at least one of a date, location, name, person, organization, and topic, from the published static content and the unpublished dynamic content;
   generating within the shared information management client, an interactive visualization comprising mappings between the published static content and the unpublished dynamic content based on the extracted entities and that is separate from content of the published static content and the unpublished dynamic content;
   linking the interactive visualization of the entities with the published static content and the unpublished dynamic content;
   editing from within the visualization at least one of the extracted entities and propagating the edit to the unpublished dynamic content or the published static content from which the edited entity was extracted;

receiving a selection of one or more of the entities of the unpublished dynamic content from within the visualization; and incorporating the unpublished dynamic content associated with the selected entities into the published static content in the shared storage.

7. A computer-implemented method according to claim 6, further comprising:

displaying the one or more information items visually proximate to the published static content within the shared information management client;

receiving a selection of at least one of the one or more information items; and updating the published static content in the shared storage with the at least one of the one or more information items.

8. A computer-implemented method according to claim 6, further comprising:

populating the interactive visualization with the extracted entities from the published static content and the unpublished dynamic content.

9. A computer-implemented method according to claim 6, wherein the visualization is a timeline.

10. A computer-implemented method according to claim 6, further comprising selecting the interactive visualization from a plurality of visualizations based on the extracted entities.

11. A system for curating dynamic content, comprising:
a processor to execute modules, comprising:
a content module to retrieve a wiki page from a shared storage associated with a wiki application;
an analysis module to identify dynamic content comprising one or more information items satisfying a similarity threshold with the wiki page;
a recommendation module to provide a recommendation of the dynamic content satisfying the similarity threshold as similar dynamic content;
a visualization module to generate a visual bridge within the wiki application from the wiki page and the similar dynamic content, comprising:
an extraction module to automatically extract entities, each comprising at least one of a date, location, name, person, organization, and topic from each of the wiki page and the dynamic content and to populate with the extracted entities an interactive visualization of the entities separate from the wiki page and the dynamic content; and
a link module to link the visualization of the entities as mappings between the wiki page and the dynamic content based on the extracted entities;
an edit module to edit from within the visualization at least one of the extracted entities and to propagate the edit to the dynamic content or the wiki page from which the edited entity was extracted;
a selection module to receive a selection of one or more of the entities of the dynamic content from within the visualization; and
an incorporation module to update the wiki page in the shared storage with the dynamic content linked with the selected entities.

12. A system according to claim 11, further comprising:
a criteria module to determine recommendation criteria for the wiki page and the dynamic content and to compare the recommendation criteria of the wiki page and the dynamic content against the similarity threshold; and
a satisfaction module to identify the dynamic content satisfying the similarity threshold.

13. A system according to claim 11, further comprising:
a reorder module to reorder entities of the wiki page within the visualization and to reorder the wiki page associated with the reordered entities.

14. A system according to claim 11, wherein the dynamic content is one of an email message, an RSS feed, microblogging message, instant message, and calendar event.

15. A system according to claim 11, further comprising:
an entity module to receive a selection of one or more of the extracted entities of the wiki page from within the visualization;
a new section module to receive a name of a new section and to create the new section in the wiki page; and
a moving module to move content associated with the selected wiki page entities into the new section.

16. A computer-implemented method for curating dynamic content, comprising:

retrieving a wiki page from a shared storage associated with a wiki application;

identifying dynamic content comprising one or more information items satisfying a similarity threshold with the wiki page;

providing a recommendation of the dynamic content satisfying the similarity threshold as similar dynamic content;

generating a visual bridge within the wiki application from the wiki page and the similar dynamic content, comprising:

extracting entities, each comprising at least one of a date, location, name, person, organization, and topic, from each of the wiki page and the dynamic content;

populating with the extracted entities an interactive visualization of the entities separate from the wiki page and the dynamic content; and linking the visualization of the entities as mappings between the wiki page and the dynamic content based on the extracted entities;

editing from within the visualization at least one of the extracted entities and propagating the edit to the dynamic content or the wiki page from which the edited entity was extracted;

receiving a selection of one or more of the entities of the dynamic content from within the visualization; and updating the wiki page in the shared storage with the dynamic content linked with the selected entities.

17. A computer-implemented method according to claim 16, further comprising:

determining recommendation criteria for the wiki page and the dynamic content;

comparing the recommendation criteria of the wiki page and the dynamic content against the similarity threshold; and identifying the dynamic content satisfying the similarity threshold.

18. A computer-implemented method according to claim 16, further comprising:

reordering the entities of the wiki page within the visualization; and reordering the wiki page associated with the reordered entities.

19. A computer-implemented method according to claim 16, wherein the dynamic content is one of an email message, an RSS feed, microblogging message, instant message, and calendar event.

20. A computer-implemented method according to claim 16, further comprising:

receiving a selection of one or more of the extracted entities of the wiki page from within the visualization;
receiving a name of a new section and creating the new section in the wiki page; and
moving content linked with the selected wiki page entities into the new section.

* * * * *